United States Patent Office 2,989,391
Patented June 20, 1961

2,989,391
METHOD FOR MODIFYING THE GROWTH CHARACTERISTICS OF PLANTS
Dorsey R. Mussell, Clare, Mich., assignor to The Dow Chemical Company, Midland, Mich., a corporation of Delaware
No Drawing. Filed Apr. 5, 1957, Ser. No. 650,855
13 Claims. (Cl. 71—2.3)

This invention is concerned with the modification of the growth characteristics of plants and is particularly directed to a method for the suppression and control of the growth of germinant seeds, emerging seedlings and established plants of many undesirable weeds.

It is an object of the present invention to provide a new method for modifying the growth characteristics of plants. Another object is the provision of a method for the suppression and control of the growth of undesirable vegetation. A further object is the provision of a method for the control of the growth of germinant seeds and emerging seedlings. An additional object is the provision of a method for the suppression of the growth of undesirable seeds and emerging seedlings, and particularly those of small seeded grasses and weeds, in soil or growth media which is supporting the growth of established plants or planted with deep planted crops such as cotton and peas. Yet another object is the provision of a method for the accomplishment of the dechlorophyllation of plants and the production of albinism. An additional object is the provision of novel compositions adapted to be employed in the new methods of modifying the growth characteristics of plants. Other objects will become apparent from the following specification and claims.

According to the present invention, it has been discovered that the growth characteristics of plants may be modified or altered by exposing a part of the growing plant to the action of a growth altering amount of a cresol compound having the formula

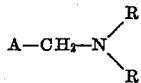

wherein each R represents methyl or ethyl and A represents a radical selected from the group consisting of

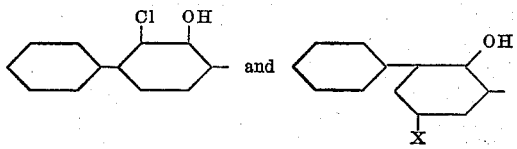

in which X represents hydrogen or chlorine. More particularly, it has been discovered that the growth of germinant seeds, seedlings and established vegetation may be suppressed and controlled by exposing the seeds, seedlings or the roots or above-ground portions of the growing plants to the action of a growth inhibiting amount of the above cresol compounds. It has also been discovered that with the proper control of dosage of the cresol compounds, the plants may be caused to lose their chlorophyll and become milky white in appearance. The cresol compounds are somewhat soluble in many organic solvents and of low solubility in water. They have been found to have a high degree of toxicity against germinant seeds and emerging seedlings and particularly those of small seeded grasses and weeds. Thus, they may be employed for the selective control of many small seeded weeds in growth media supporting the growth of well established plants or planted with deep planted crops such as corn, cotton, peas, and soybeans. Further, the cresol compounds have a high degree of persistency in soil and give excellent controls of small seeded grasses such as crab grass and Johnson grass for periods ranging up to several months.

The exposure of growing plants and plant parts or a viable form of plants to the action of the cresol compounds give rise to varying responses depending upon the form and nature of the plant, the stage of growth or maturity of the plant and the dosage of cresol compound at which the exposure is carried out, as well as the weather conditions of temperature and moisture. When large dosages are applied to the foliage of plants, a substantially complete kill of most plant species is obtained. The distribution of large dosages in growth media controls the growth of most germinant seeds, seedlings and established plants. This approaches a sterilization action. The weathering action of the sun and rain and possible decomposition of the cresol compounds by the action of bacteria and other soil organisms eventually reduces the concentration of the compounds to a minimum in the soil. Soil applications of more dilute dosages of the cresol compounds suppress the growth of many small seeded weed species while having little or no effect upon established plants or the seeds of deep planted crops. Thus the compounds may be employed for the selective control of many small seeded weeds in plantings of deep planted crop plants or in stands of established plants. Where plants are exposed to minimal dosages of the cresol compounds, they are caused to lose a greater proportion of their chlorophyll and become white in appearance. Following the dechlorophyllation, the plants die within several days.

The exposure of the viable form of the plant to the action of a growth altering amount of the cresol compounds is essential for the practice of the present invention. In foliage treatments for the control of the growth of vegetation, good results are obtained when from 1 to 50 pounds of the cresol compounds are applied per acre. In non-selective applications to growth media, good results are obtained when a dosage of the cresol compounds is supplied in the amount of about 2 to 100 parts or more by weight per million parts by weight of the medium. In non-selective applications to soil, good results are obtained when the cresol compounds are distributed at the rate of from about 1.0 to 100 pounds or more per acre and through such a cross section of the soil as to provide for the presence therein of an effective concentration of the treating agents. In such applications, it is desirable that the compounds be distributed to a depth of at least 0.25 inch. In preemergent and post-emergent applications for the control of the growth of the germinant seeds and seedlings of many undesirable small seeded weeds, and particularly those of small seeded grasses, in plantings of deep planted crop plants or in established stands of crop plants such as cotton, good results are obtained when the cresol compounds are applied to the surface of the soil and/or the foliage of the small seeded weed species at a dosage of from 1.0 to 20 pounds per acre. In preemergent applications to soil, it is desirable that the cresol compounds be distributed in the soil to a depth no greater than 1.5 inches.

The method of the present invention may be carried out by applying to the above ground portion of plants or by applying to the growth media the unmodified cresol compounds. However, the present method also embraces the employment of liquid or dust compositions containing said compounds. In such usage, the compounds may be modified with one or more of a plurality of additaments or herbicide adjuvants such as water, petroleum distillates or other organic solvent carriers, surface active dispersing agents, and finely divided inert solids. Depending upon the concentration of the toxicant, such augmented compositions are adapted to be distributed in or on the soil, or on the above ground portions of the plants, or employed as concentrates and subsequently diluted with additional inert carrier to produce the ultimate treating compositions.

The exact concentration of the cresol compounds to be employed in compositions for the treatment of growth media and foliage is not critical and may vary considerably provided the required dosage of active agent is supplied in the growth media or upon the above ground surfaces of plants. The concentration of toxicant in liquid compositions employed to supply the desired dosage generally is from about 0.1 to 50 percent by weight, although concentrations of 0.0001 percent by weight may be employed in irrigation treatments of soil. In dusts, the concentration of toxicant may be from 1.0 to 50 percent by weight, although concentrations as low as 0.1 percent are sometimes employed. In compositions to be employed as concentrates, the toxicant oftentimes is present in a concentration of from about 5 to 95 percent by weight.

The quantity of treating composition to be applied may vary considerably provided the required dosage of active ingredient is applied in sufficient of the finished composition to cover adequately the vegetation to be treated or to facilitate the penetration and distribution of the active ingredient in growth media. The required amount of active ingredient in the soil conveniently may be supplied per acre treated in from 40 to 27,000 gallons or more of the aqueous carrier, in from 5 to 50 gallons of organic solvent, or in from 50 to 2000 pounds of inert solid carrier. In the treatment of seedling weeds, good coverage is obtained when using from 10 to 100 gallons or more of finished spray composition per acre. Where large succulent vegetation is concerned, it is frequently desirable to employ up to 250 gallons or more of the finished spray composition per acre to assure complete coverage of the above ground portion of the vegetation. In the application of dusts to plant foliage, good results are obtained with from 50 to 2000 pounds of finished dust composition per acre, the only requirements being that the required toxicant dosage be supplied in sufficient dust to achieve good coverage of the foliage.

Liquid compositions containing the desired amount of the cresol compounds may be prepared by dissolving the toxicants in an organic liquid such as acetone, xylene or petroleum distillates or by dispersing the toxicants in water with or without the aid of a suitable surface active dispersing agent such as an ionic or nonionic emulsifying agent. The aqueous compositions may contain one or more water-immiscible solvents for the cresol compounds. In such compositions the carrier comprises an aqueous emulsion, that is, a mixture of water-immiscible solvent, emulsifying agent and water. The choice of dispersing and emulsifying agent and the amount thereof employed is dictated by the nature of the composition type and by the ability of the agent to facilitate the dispersion of the compound in the carrier to produce the desired composition. Dispersing and emulsifying agents which may be employed in the compositons include the condensation products of alkylene oxides with phenols and organic acids, alkyl aryl sulfonates, polyoxyethylene derivatives of sorbitan esters, complex ether alcohols, mahogany soaps and the like. The surface active dispersing agents are generally employed in the liquid compositions in the amount of from 1 to 20 percent by weight of the combined weight of the cresol compound and the surface active agent.

In the preparation of dust compositions, the cresol compounds are dispersed in and on a finely divided inert solid such as talc, chalk, gypsum and the like. In such operations, the carrier may be mechanically ground with the compounds or wet with a volatile organic solvent solution thereof. Similarly, dust compositions containing the compounds may be prepared from various solid surface active dispersing agents such as bentonite, fuller's earth, attapulgite and other clays. Depending upon the proportions of ingredients, these dust compositions may be employed as concentrates and subsequently diluted with additional solid surface active dispersing agent or with talc, chalk, gypsum and the like to obtain the desired amount of active ingredient in a composition adapted to be employed for the control of the growth of vegetation. Also, the concentrate dust compositions may be dispersed in water with or without the aid of a dispersing agent to form spray mixtures.

When operating in accordance with the present invention, growth inhibiting amounts of the compounds or a compositon containing the toxicants are dispersed in any convenient fashion in soil or other growth media, i.e., by simple mixing with the growth media, or by applying to the surface of soil and thereafter dragging or disking into the soil to the desired depth or by employing a liquid carrier to accomplish the penetration and impregnation. The application of the spray and dust compositions to the surface of soil or to the above ground surfaces of plants may be carried out by conventional methods, for example with power dusters, boom or hand sprayers and spray dusters.

In a further method, the distribution in soil may be accomplished by introducing the toxicant in the water employed to irrigate the soil. In such procedure, the amount of water may be varied in accordance with the porosity and water-holding capacity of the soil in order to obtain the desired depth of distribution of the toxicant.

The following examples illustrate the invention but are not to be construed as a limitation thereof:

*Example 1*

25 parts by weight of $\alpha$-(N-methyl-N-ethylamino)-6-phenyl-o-cresol and $\alpha$-(diethylamino)-6-phenyl-o-cresol are each separately mixed and ground with 10 parts of a dimeric alkylated aryl polyether alcohol (Triton X–155) and 65 parts of xylene to prepare concentrate compositions in the form of emulsifiable liquids.

In a similar manner, 25 parts by weight of $\alpha$-(dimethylamino)-6-phenyl-o-cresol, 71 parts of fuller's earth, 2 parts of an alkyl aryl sulfonate (Nacconol NR) and 2 parts of a polymerized sodium salt of a substituted benzoid alkyl sulfonic acid (Daxad No. 27) are mechanically mixed and ground together to prepare a concentrate composition in the form of a wettable powder.

Also, a mixture of 20 parts by weight of 6-chloro-$\alpha$-(diethylamino)-5-phenyl-o-cresol, 0.1 part of Nacconol NR, 0.1 part of Daxad No. 27 and 200 parts of water are ball milled together to prepare a water dispersible liquid concentrate composition.

These concentrate compositions are adapted to be dispersed in water to prepare aqueous compositions having very desirable wetting and penetrating properties. The latter aqueous compositions may be employed to distribute growth altering amounts of the cresol compounds in the soil or upon the surfaces of plants and plant parts.

*Example 2*

25 parts by weight of $\alpha$-(dimethylamino)-6-phenyl-o-cresol (melting at 109°–111° C.), 2 parts of Nacconol NR, 2 parts of Daxad No. 27, and 71 parts of fuller's earth were mixed together to prepare a wettable powder concentrate composition. A portion of this concentrate was dispersed in water to produce an aqueous composition containing 0.4 pound of the cresol compound per 100 gallons of ultimate mixture. This composition was employed for the treatment of soil areas which had been prepared and seeded to Japanese millet, radish and wild oats. In the treating operations, the composition was applied to the soil areas as a soil drench and at a rate of about 0.43 acre-inch of composition per acre to supply a substantially uniform dosage of 50 pounds of the cresol compound per acre. Other areas similarly prepared and seeded were left untreated to serve as checks.

After 3 weeks, the treated areas were examined to ascertain what control of the growth of seeds and emerging seedlings had been obtained. The results of such examination are set forth in Table I.

TABLE I

| Seed Species | Percent Control of the Growth of Seeds and Emerging Seedlings |
| --- | --- |
| Japanese Millet | 95 |
| Radish | 100 |
| Wild Oats | 90 |

At the time of observation, the check areas were found to support luxuriant and vigorously growing stands of the named plant species.

*Example 3*

A portion of a wettable powder concentrate composition containing 25 parts by weight of 4-chloro-α-(dimethylamino)-6-phenyl-o-cresol (melting at 65°–66.5° C.), 2 parts of Nacconol NR, 2 parts Daxad No. 27 and 71 parts of fuller's earth was dispersed in water to prepare aqueous compositions containing 0.42, 0.83 and 1.66 pound of 4-chloro-α-(dimethylamino)-6-phenyl-o-cresol per 100 gallons of ultimate mixture. These aqueous compositions were applied to the foliage of plots of seedlings of various grass species and broad leaf plants. At the time of the applications, the seedling plants were from about 3 to 6 inches tall. In the treating operations, the compositions were applied to the foliage of the plants ot the point of run off with conventional spraying equipment. Similar stands of the named plant species were left untreated to serve as checks.

After three weeks, the plots were examined to ascertain what control of the growth of the plants had been obtained. The results are set forth in Table II.

TABLE II

| Plant Species | Percent Control of the Growth of the Seedling Species at the Various Indicated Concentrations of Toxicant in the Spray Composition in Pounds Per 100 Gallons | | |
| --- | --- | --- | --- |
| | 1.66 | 0.83 | 0.42 |
| Corn | 70 | 40 | 40 |
| Soybean | 80 | | |
| Wheat | 0 | 0 | 0 |
| Radish | 70 | 40 | 20 |
| Japanese Millet | 70 | 60 | 80 |
| Flax | 80 | 80 | 80 |
| German Millet | 70 | 80 | 80 |
| Morning Glory | 100 | 100 | 100 |
| Cotton | 30 | 30 | 0 |

At the time of observation, heavy stands of the named plant species were found in the check plots.

*Example 4*

25 parts by weight of 6-chloro-α-(diethylamino)-5-phenyl-o-cresol (molecular weight of 289.8), 2 parts of Nacconol NR, 2 parts of Daxad No. 27 and 71 parts of fuller's earth were mixed and ground together and a portion of the resulting concentrate composition dispersed in water to produce an aqueous spray composition containing 0.4 pound of the cresol compound per 100 gallons of ultimate mixture. This composition was employed as described in Example 2 for the control of the growth of the germinant seeds and emerging seedlings of several grass and broad leaf plant species. In the treating operations, the composition was applied as a soil drench and at a rate of about 0.43 acre-inch of composition per acre to supply a substantially uniform dosage of 50 pounds of the cresol compound per acre. Other areas similarly prepared and seeded were left untreated to serve as checks.

After three weeks, the areas were examined to ascertain what control of the growth of the seeds and emerging seedlings had been obtained. The results of such examination are listed in Table III.

TABLE III

| Seed Species | Percent Control of the Growth of Seeds and Emerging Seedlings |
| --- | --- |
| Japanese Millet | 100 |
| Radish | 80 |
| Wild Oats | 100 |
| Johnson Grass | 95 |
| German Millet | 100 |

At the time of observation, the check areas were found to support vigorously growing stands of the named plant species.

*Example 5*

25 parts by weight of 4-chloro-α(diethylamino)-6-phenyl-o-cresol, 2 parts of Nacconol NR, 2 parts of Daxad No. 27 and 71 parts of fuller's earth were mixed and ground together and a portion of the resulting concentrate composition dispersed in water to prepare an aqueous composition containing 0.4 pound of the cresol compound per 100 gallons of ultimate mixture. This composition was employed exactly as described in Example 2 for the control of the growth of seeds and emerging seedlings of Japanese millet, radish and wild oats. The results of such operations are listed in Table IV.

TABLE IV

| Seed Species | Percent Control of the Growth of Seeds and Emerging Seedlings |
| --- | --- |
| Japanese Millet | 95 |
| Radish | 85 |
| Wild Oats | 75 |

At the time of observation, the check areas were found to support vigorously growing stands of millet, wild oats and radish.

*Example 6*

A portion of the wettable powder concentrate composition as described in Example 3 was dispersed in water to prepare an aqueous spray composition containing 1.66 pounds of 4-chloro-α-(dimethylamino)-6-phenyl-o-cresol per 100 gallons of ultimate mixture. This composition was applied to the foliage of various grass and broadleaf plants exactly as described in Example 3. Similar stands of the same plant species were left untreated to serve as checks. 14 days following the applications the plants were observed to determine what percent dechlorophyllation or albinism had taken place attributable to the applications. The results are set forth in Table V.

TABLE V

| Plant Species | Percent Dechlorophyllation |
| --- | --- |
| Corn | 70 |
| Soybean | 80 |
| Radish | 70 |
| Flax | 80 |
| Cotton | 30 |

At the time of observation, lush and green stands of the named plant species were found in the untreated checks.

Example 7

A portion of wettable powder concentrate as described in Example 4 was dispersed in water to produce an aqueous spray composition containing 0.16 pound of 6-chloro-α-(diethylamino)-5-phenyl-o-cresol per 100 gallons of ultimate mixture. This composition was employed as described in Example 2 for the control of germinant seeds and emerging seedlings of several grass and broadleaf plant species. In the treating operations, the composition was employed as a soil drench and at a rate of about 0.43 acre-inch of composition per acre to supply a substantially uniform dosage of 20 pounds of the cresol compound per acre. Other areas similarly seeded were left untreated to serve as checks. After three weeks, the areas were examined to ascertain what control of the growth of the seeds and emerging seedlings had been obtained. The results are set for in Table VI.

TABLE VI

| Seed Species | Percent Control of the Growth of Seeds and Emerging Seedlings |
| --- | --- |
| Amaranthus | 100 |
| Japanese Millet | 95 |
| German Millet | 100 |
| Cotton | 0 |
| Alaska Peas | 0 |
| Crabgrass | 100 |

At the time of observation, the check areas were found to support vigorously growing stands of the named plant species.

Example 8

In a further operation a portion of the wettable powder concentrate as described in Example 4 was dispersed in water to prepare an aqueous spray composition containing 0.1 pound of 6-chloro-α-(diethylamino)-5-phenyl-o-cresol per 100 gallons of ultimate mixture. This composition was employed as described in Example 2 for the control of the growth of the seeds and emerging seedlings, Japanese millet, radish and wild oats. In the treating operations, the composition was employed as a soil drench and at a rate of about 0.43 acre-inch of composition per acre to supply a substantially uniform dosage of 12.5 pounds of the o-cresol compound per acre. Other areas similarly seeded were left untreated to serve as checks. After three weeks, the areas were examined to ascertain what control of the growth of the seeds and emerging seedlings had been obtained. The results of such examination are listed in Table VII.

TABLE VII

| Seed Species | Percent Control of the Growth of Seeds and Emerging Seedlings |
| --- | --- |
| Japanese Millet | 100 |
| Radish | 70 |
| Wild Oats | 75 |

At the time of observation, the check areas were found to support vigorously growing stands of the named plant species.

Example 9

A portion of the wettable powder concentrate prepared in Example 4 was dispersed in water to prepare an aqueous composition containing 0.04 pound of 6-chloro-α-(diethylamino)-5-phenyl-o-cresol per 100 gallons of ultimate mixture. This composition was employed as described in Example 2 for the control of the growth of the seeds and emerging seedlings of several grasses and broadleaf plants. In the treating operations, the composition was employed as a soil drench and at a rate of about 0.43 acre-inch of composition per acre to supply a substantially uniform dosage of 5 pounds of the cresol compound per acre. Other areas similarly seeded were left untreated to serve as checks. After three weeks, the areas were examined to ascertain what control of the growth of the seeds and emerging seedlings had been obtained. The results of such examination are listed in Table VIII.

TABLE VIII

| Seed Species | Percent Control of the Growth of Seeds and Emerging Seedlings |
| --- | --- |
| German Millet | 70 |
| Cotton | 0 |
| Alaska Peas | 0 |
| Crabgrass | 100 |
| Amaranthus | 100 |

At the time of observation, the check areas were found to support vigorously growing stands of the named plant species.

Example 10

A portion of the wettable powder concentrate composition as described in Example 1 was dispersed in water to prepare aqueous compositions containing 0.16, 0.04 and 0.016 pound of the α-(dimethylamino)-6-phenyl-o-cresol per 100 gallons of ultimate mixture. These aqueous compositions were employed for the treatment of soil areas which had been prepared and seeded to several grass and broadleaf plant species. In the treating operations, the compositions were applied as a soil drench and at a rate of about 0.43 acre-inch of composition per acre to supply substantially uniform dosages of 20, 5 and 2 pounds, respectively, of the o-cresol compound per acre. Other areas similarly seeded were left untreated to serve as checks. After three weeks, the areas were examined to ascertain what control of the growth of the seeds and emerging seedlings had been obtained. The results of such examination are listed in Table IX.

TABLE IX

| Seed Species | Percent Control of the Growth of Seeds and Emerging Seedlings at the Indicated Dosages of Toxicant in Pounds Per Acre | | |
| --- | --- | --- | --- |
| | 20 | 5 | 2 |
| Cotton | 20 | 0 | 0 |
| Soybean | 0 | 0 | 0 |
| German Millet | 100 | 95 | 90 |
| Crabgrass | 99 | 40 | 40 |
| Johnson Grass | 100 | 95 | 30 |
| Corn | 0 | 0 | 0 |
| Oats, Domestic | 20 | 0 | 0 |
| Wheat | 0 | 0 | 0 |

At the time of observation, the check areas were found to support vigorously growing stands of the named plant species.

Example 11

A portion of the wettable powder concentrate composition as described in Example 5 was dispersed in water to produce an aqueous composition containing 0.16 pound of the 4-chloro-α-(diethylamino)-6-phenyl-o-cresol per 100 gallons of ultimate mixture. This composition was employed as described in Example 2 for the control of the growth of the seeds and emerging seedlings of various grass and broadleaf plant species. In the treating operations the composition was applied as a soil drench and at a rate of about 0.43 acre inch of composition per acre to supply a substantially uniform usage of 20 pounds of cresol compound per acre. After three weeks, the areas were examined to ascertain what control of the growth of the seeds and emerging seedlings had been obtained. The results of such examination are listed in Table X.

TABLE X

| Seed Species | Percent Control of the Growth of Seeds and Emerging Seedlings |
|---|---|
| Oats, Domestic | 0 |
| Cotton | 0 |
| Canary Grass | 99 |
| Turnip | 0 |

At the time of observation, the check areas were found to support vigorously growing stands of the named plant species.

The compounds as employed in accordance with the present invention may be prepared according to known methods by causing an interaction between formaldehyde, a suitable dialkyl amine, (R)(R)NH, and a phenol having the formula A—H. In a convenient method of carrying out the reaction, one molecular proportion of formaldehyde is added to a mixture comprising one molecular proportion of each of the phenol and amine reactants in a solvent such as ethanol. The reaction takes place readily at temperatures above 20° C. with the production of the desired product and water of reaction. Upon completion of the reaction, the reaction mixture may be cooled and filtered to separate the desired product as a crystalline solid.

I claim:

1. A method for the selective control of the growth of germinant seeds and emerging seedlings of small seeded grasses and broad leaf weeds which comprises exposing growing plants and plant parts of said grasses and weeds to the action of a growth inhibiting amount of a cresol compound having the formula $$A-CH_2-N\begin{matrix}R\\R\end{matrix}$$

wherein each R represents a member of the group consisting of methyl and ethyl and A represents a radical selected from the group consisting of

[structures showing Cl, OH substituted biphenyl and phenyl-substituted phenol with X]

in which X is a member of the group consisting of hydrogen and chlorine.

2. A method claimed in claim 1 wherein the cresol compound is employed in the form of a composition made up of the cresol compound in intimate admixture with a herbicide adjuvant as a carrier therefor.

3. An agronomical practice for the selective control of the growth of germinant seeds and emerging seedlings of small seeded grasses and broad leaf weeds which comprises impregnating soil with a growth inhibiting concentration of a cresol compound having the formula $$A-CH_2-N\begin{matrix}R\\R\end{matrix}$$

wherein each R represents a member of the group consisting of methyl and ethyl and A represents a radical selected from the group consisting of

[structures showing Cl, OH substituted biphenyl and phenyl-substituted phenol with X]

in which X is a member of the group consisting of hydrogen and chlorine.

4. A method claimed in claim 3 wherein the soil is impregnated with the cresol compound at a concentration of at least 2 parts by weight per million parts by weight of soil.

5. A method for the selective control of the growth of the germinant seeds and emerging seedlings of small seeded grasses and broadleaf weeds in soil planted with the seeds of deep-planted crop plants which comprises distributing in such soil to a depth not to exceed 1.5 inches, a dosage of from 1 to 20 pounds per acre of a cresol compound having the formula $$A-CH_2-N\begin{matrix}R\\R\end{matrix}$$

wherein R represents a member of the group consisting of methyl and ethyl and A represents a radical selected from the group consisting of

[structures showing Cl, OH substituted biphenyl and phenyl-substituted phenol with X]

in which X is a member of the group consisting of hydrogen and chlorine.

6. A method claimed in claim 1 wherein said cresol compound is α-dimethylamino-6-phenyl-o-cresol.

7. A method claimed in claim 1 wherein said cresol compound is 6-chloro - α - (diethylamino) - 5 - phenyl-o-cresol.

8. A method claimed in claim 1 wherein said cresol compound is 4-chloro-α-(dimethylamino) - 6 - phenyl-o-cresol.

9. A method claimed in claim 1 wherein said cresol compound is 4 - chloro-α-(diethylamino) - 6 - phenyl-o-cresol.

10. A method claimed in claim 5 wherein said cresol compound is α-dimethylamino-6-phenyl-o-cresol.

11. A method claimed in claim 5 wherein said cresol compound is 6 - chloro-α-(diethylamino) - 5 - phenyl-o-cresol.

12. A method claimed in claim 5 wherein said cresol compound is 4-chloro-α-(dimethylamino) - 6 - phenyl-o-cresol.

13. A method claimed in claim 5 wherein said cresol compound is 4 - chloro - α - (diethylamino)-6-phenyl-o-cresol.

References Cited in the file of this patent

UNITED STATES PATENTS

| | | |
|---|---|---|
| 2,014,720 | Christiansen et al. | Sept. 17, 1935 |
| 2,262,720 | Earle | Nov. 11, 1941 |
| 2,392,859 | Meuli | Jan. 15, 1946 |
| 2,747,982 | Mussell | May 29, 1956 |
| 2,747,983 | Mussell | May 29, 1956 |
| 2,784,138 | Wegler et al. | Mar. 5, 1957 |

OTHER REFERENCES

Burckhater et al.: J.A.C.S., vol. 68, October 1946, pages 1894–1901.